United States Patent [19]

Todd

[11] 4,022,475
[45] May 10, 1977

[54] GOLF TRAINING AID

[76] Inventor: Irma L. Todd, 395 N. Frankwood Ave., Sanger, Calif. 93657

[22] Filed: Dec. 12, 1974

[21] Appl. No.: 532,040

[52] U.S. Cl. .................. 273/183 B; 2/13; 33/262; 273/183 E; 273/DIG. 17; 351/46
[51] Int. Cl.² ............ A63B 69/36; G02C 7/16
[58] Field of Search ....... 273/190 R, 190 A, 190 B, 273/190 C, 183 R, 183 B, 183 E, 183 C, 183 D, DIG. 17, DIG. 27; 2/12, 13, 14 R, 14 B, 14 C, 14 D, 14 E, 14 F, 14 G, 14 H, 14 J, 14 K, 14 L, 14 M, 14 N, 14 P, 14 Q, 14 S, 14 T, 14 UT, 14 V, 14 W, 14 XS, 14 Y, 8; 33/262, 276, 277, 278, 279, 280, 46, 289, 263, 275 R, 275 G; 351/41, 14, 45, 46, 158

[56] References Cited

UNITED STATES PATENTS

| | | | |
|---|---|---|---|
| 1,637,406 | 8/1927 | Brumder | 273/183 B |
| 1,712,360 | 5/1929 | Slaughter | 351/46 X |
| 1,742,049 | 12/1929 | Rollins | 2/12 X |
| 1,744,282 | 1/1930 | Rollins et al. | 2/12 X |
| 1,887,871 | 11/1932 | Craig | 2/13 |
| 2,663,021 | 12/1953 | Douglass | 273/190 A UX |
| 2,759,394 | 8/1956 | Evans | 2/14 S X |
| 3,092,838 | 6/1963 | Vacha | 2/12 |
| 3,228,696 | 1/1966 | Hull | 273/183 B |
| 3,446,548 | 5/1969 | Rummel et al. | 2/13 X |
| 3,538,509 | 11/1970 | Sachse | 2/12 |

FOREIGN PATENTS OR APPLICATIONS

| | | | |
|---|---|---|---|
| 142,313 | 5/1920 | United Kingdom | 351/45 |
| 223,055 | 10/1924 | United Kingdom | 351/45 |

*Primary Examiner*—Richard C. Pinkham
*Assistant Examiner*—Arnold W. Kramer
*Attorney, Agent, or Firm*—Vergil L. Gerard

[57] ABSTRACT

Disclosed is a pair of eyeglasses with laterally slidable vision screens in each of the eyeglass openings. The vision screens have an opaque lower portion and a transparent upper portion, and have a clear see-through vertical slit which extends into the lower portion. By adjusting the vision screen so the golf ball, before it is struck, is viewed through the slits, and by keeping the ball in such view during the swing, the golfer controls his head position. A second form of my invention is shown which clips onto the user's regular eyeglasses, and a third form attaches adhesively to the lower portion of regular eyeglasses.

2 Claims, 8 Drawing Figures

U.S. Patent        May 10, 1977        4,022,475
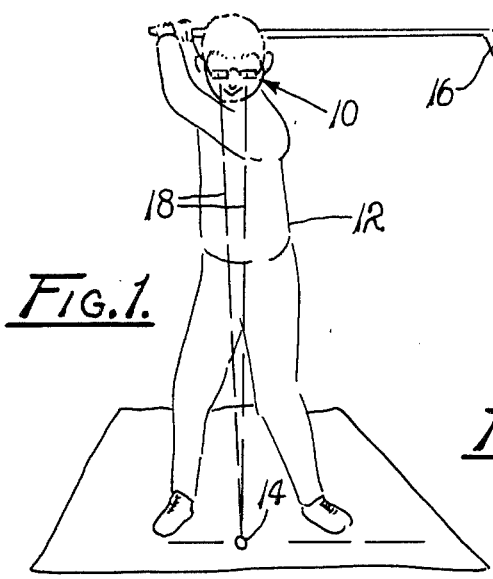
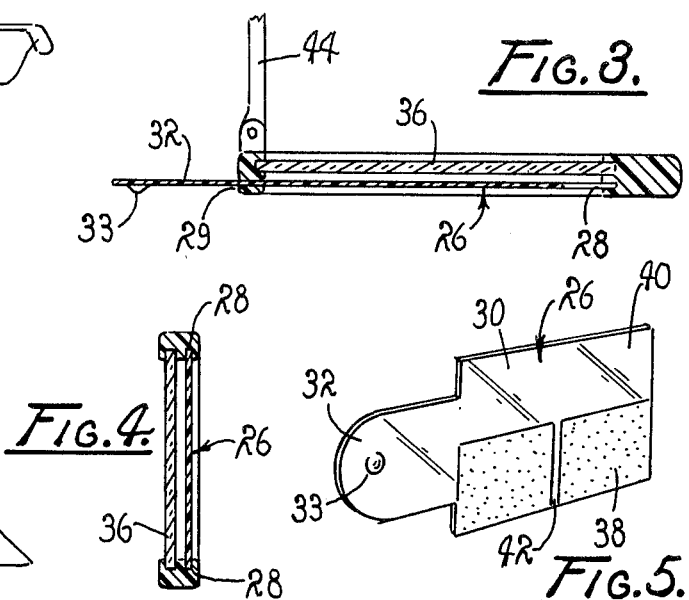
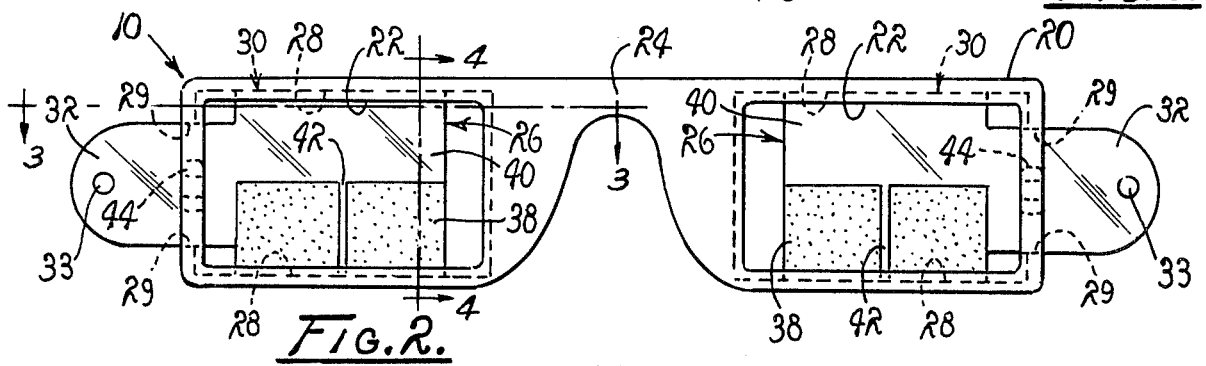
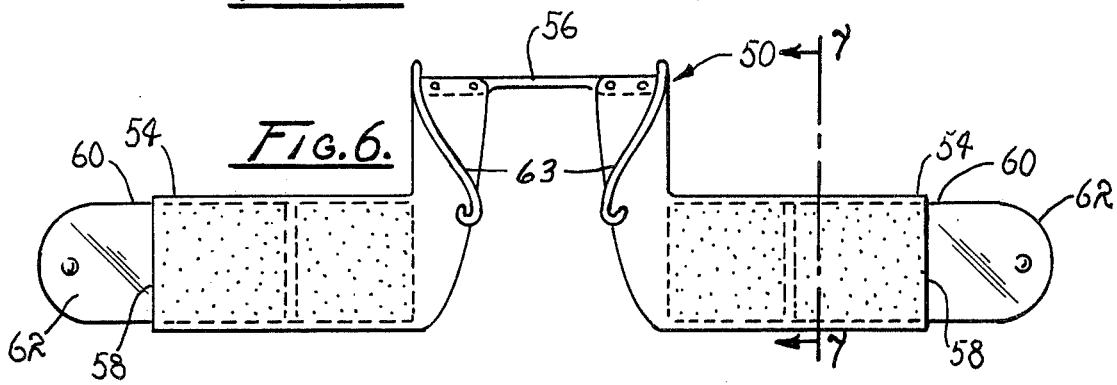
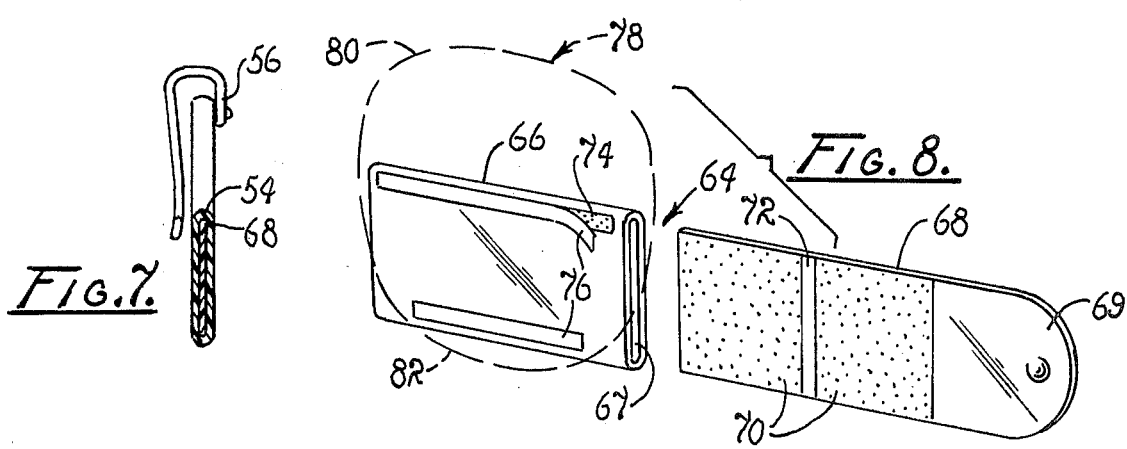

GOLF TRAINING AID

BACKGROUND OF INVENTION

This invention relates generally to golf training devices, and more particularly to devices for controlling body position during the golfer's swing.

Golf continues to increase in popularity and has long been recognized as a challenging sport to master. Most golfers pursue a constant program directed toward improvement of their game, and many training devices and learning techniques have been developed to help in this effort.

One recognized area of improvement for a golfer's swing is control of his head and eyes. It has long been known to be important for the golfer to keep his eyes on the ball during his swing, and to hold his head in a relatively fixed position. This is felt to be so since the eyes control the reflexes by which the golfer brings the club head into contact with the ball and keeping the head relatively fixed holds the body in proper alignment with the ball.

Though golf teaching techniques have long stressed these fundamentals, they are difficult to master, and prior to my invention no aid was known to exist to help the golfer learn them.

It is, therefore, a major object of my invention to provide a golf training aid which teaches the golfer to hold his head fixed and his eyes on the ball during his swing.

It is also an important object of my invention to provide a golf training aid which fits over the eyes of the golfer and effectuates control of the golfer's swing by controlling his vision.

Another object of my invention is to provide a golf training aid of the type described which is inexpensive to manufacture and easy to use.

A further object of my invention is to provide a golf training aid of the type described that is readily adaptable to any golfer and can be made to work with the prescription glasses of a golfer.

These and other objects and advantages of my invention will become more readily apparent from the following detailed description of a preferred embodiment when read together with the accompanying drawings, in which:

FIG. 1 is a front elevational view of a golfer disposed over a golf ball and wearing a preferred embodiment of my invention;

FIG. 2 is an enlarged front elevational view of the preferred embodiment of my invention;

FIG. 3 is a sectional view taken on 3—3 in FIG. 2;

FIG. 4 is a sectional view taken on 4—4 in FIG. 2;

FIG. 5 is a perspective view of a vision screen disposable in the eye pieces of my preferred embodiment;

FIG. 6 is a front elevational view of an alternate form of my preferred embodiment arranged for attachment to regular eyeglasses of the user;

FIG. 7 is a sectional view taken on 7—7 in FIG. 6; and

FIG. 8 is a perspective view of a third form of my invention which attaches adhesively to a regular pair of eyeglasses.

Referring now to the drawings, and particularly to FIGS. 1 through 5 thereof, the numeral 10 designates generally a preferred embodiment of my invention. In FIG. 1 my golf training aid is shown on the eyes of a golfer 12 who stands over a golf ball 14 with a golf club 16 in back stroke position. Sight lines 18 show the lines of vision from the user's eyes to the ball 14.

In FIG. 2, I show an enlarged view of my aid 10. The aid 10 has a frame 20 with a pair of generally rectangular eye apertures 22 interconnected by a nose bridge 24. A pair of vision screens 26 are mounted in the eye apertures in tracks 28.

As best shown in FIGS. 2 through 5, the tracks 28 are formed in the upper and lower portions of the frame 20 adjacent each of the eye apertures 22 and interconnect at the inner vertical edge of the eye apertures to form a generally U-shaped grove for receiving and holding the vision screens 26.

The tracks 28 also extend part way down the vertical edge of the eye apertures 22 at the outer portions of the frame, and terminate in tab slots 29.

The vision screens 26 have an aperture screening portion 30 which covers the user's normal line of vision when the screens are properly located in the eye apertures 22, and a gripping tab 32 whereby the screens may be manually gripped for sliding them in the tracks 28. The gripping tabs 32 extend through the tab slots 29 and laterally beyond the outer portions of the frame 20 for easy gripping. A detent 33 is provided on the outer portion of each of the tabs 32 to assist manual gripping.

A glass lens 36 is provided in the eye aperture 22 just behind the vision screens 26 on the side toward the user's eye. In this embodiment the lenses 36 are straight glass and not corrective lenses, so that any user can use them without effecting his vision.

The aperture screening portions 30 of the vision screens 26 each have a lower half 38 which is opaque, an upper half 40 which is transparent, and a vertically disposed elongated sight slit 42 which extends vertically through the opaque lower half 38 and is also transparent.

As best seen in FIG. 3, the frames 20 also have ear pieces 44 which pivotally attach to the outer edges of the frame and extend rearwardly on each side of the user's head to engage his ears and hold the aid 10 in place in the same manner as for regular eyeglasses.

In operation, my golf training aid performs as follows. The user first stations himself over the ball 14 in proper position for a golf swing, and aligns his club 16 with the ball 14 by practice swings in the usual manner. The aid 10 is then placed on the user in the same manner as a pair of eye glasses, and while keeping his head in the proper position as determined from his practice swings, the user adjusts the vision screens 26 by grasping the tabs 32 with his fingers and moving the screens laterally until the sight slits 42 permit him to see the ball 14 with each eye (see FIG. 1).

The user then commences his swing, keeping his eyes directed at the ball 14. He may take additional practice swings if desired, or may proceed to his final swing. If, during the swing, he starts to move his head to either side, he will start to lose sight of the ball because the sight slits 42 in the vision screens 26 will move with his head and direct his vision toward the opaque lower half 38 of the vision screens. Likewise, if he starts to move his head toward or away from the ball 14 during his swing his sight of the ball will be effected because the sight lines of both eyes will not converge on the ball.

The golfer will, therefore, have a continuous awareness of his head, and a facility by which he may keep his head position fixed during his swing. Since his body naturally relates to the position of his head, he can hold his swing together and keep a proper club to ball relationship.

Furthermore, he is effectively reminded by my golf aid 10 to keep his eyes on the ball at all times during his swing and is immediately aware when he is not doing so since the control he seeks with my aid requires continuous eye to ball sight.

In FIGS. 6 and 7, I show a modified form of my invention, adapted for golfers who require prescription eyeglasses or sunglasses. The aid 50 has a frame consisting of a pair of eye aperture envelopes 54 connected by a nose bridge 56. The eye aperture envelopes 54 are fully transparent and have openings 58 at their outer ends. Vision screens 60, substantially the same as vision screens 26 in my first embodiment, except that they are totally opaque and adapted to cover only the lower portion of the user's lenses, are slidably mounted in the eye aperture envelopes 54 through the openings 58. The gripping tabs 62 on the outer portions of the vision screens permit manual gripping for lateral adjustment of the vision screens 60 in the envelopes 54.

In this second form of my invention the eye aperture envelopes are disposed to cover only the lower portion of the user's vision like the lower lenses in bi-focals. For this reason, the vision screens are all opaque except for the transparent sight slits. To track the flight of the ball the user need only look upward over the eye aperture envelopes and he will have clear vision.

A pair of spring clips 63 are mounted on the nose piece 56 of the frame and fit over the frame of a user's glasses to attach my aid 50 to the outside of his glasses.

Use of my second form is substantially the same as for my first form.

In FIG. 8 I show a third form of my invention 64. The third form is similar to my second form except the vision screens are each individually mounted on the lower portion of the lenses of a user's eyeglasses by means of transparent envelopes 66 with slots 67. Slides 68 fit slidably in the slots 67 and each have grips 69 at their outer ends. The slides 68 have an opaque area covering their inner portions 70 with a vertical transparent slit 72. The envelopes 66 are adhesively attached to each lens by adhesive strips 74 with peeloff covers 76.

To illustrate the mounting position of the vision screens I show in phantom a lens 78 having an upper portion 80 and a lower portion 82.

Having described in detail the various parts of a preferred embodiment of my invention, and its manner of use, it should be understood that my invention is fully capable of achieving the objects and providing the advantages heretofore attributed to it.

I claim:

1. A golf training aid comprising:
   vision screening means having an opaque portion and a transparent portion;
   frame means disposed to movably mount said vision screening means with respect to said frame means, said frame means includes a transparent envelope with a slot shaped bore disposed to receive said vision screening means for reciprocal movement therein; and
   frame mounting means interconnected with said frame means and disposed to mount said frame means in a user's line of sight with a golf ball, when said user is in striking position with respect to said golf ball, said frame mounting means includes an adhesive area on said frame means disposed for attachment to the glass of a pair of eye glasses.

2. A golf training aid as described in claim 1, in which:
   said vision screening means includes a pair of vision screens each having an opaque portion of a size and configuration adapted to cover the lower half of a user's field of vision when disposed in front of his eyes in substantially the same manner as eyeglasses, and a transparent slit passing through said opaque portion and disposed generally vertically with respect to said user;
   said frame means includes a pair of support frames, one disposed to support each of said vision screens, each of said support frames having screen mounting means disposed to movably mount one of said vision screens therein, whereby said vision screen can be reciprocated horizontally with respect to said support frame and to move said transparent slit laterally in said user's field of vision, said pair of support frames are tubular, transparent envelopes with horizontally directed slots disposed to reciprocally mount said vision screens; and
   said frame mounting means including means for mounting each of said support frames before the eyes of a user in the same manner as a pair of glasses, said frame mounting means includes adhesive attachment strips on each of said envelopes disposed to adhesively attach said envelopes to the glass of a pair of eyeglasses.

* * * * *